United States Patent
Campbell

(10) Patent No.: US 6,562,106 B2
(45) Date of Patent: May 13, 2003

(54) ATMOSPHERE TREATMENT DEVICE FOR SEALED CONTAINERS

(75) Inventor: Gary J. Campbell, Blanchard, MI (US)

(73) Assignee: Life Line Water Co., LLC, Traverse City, MI (US)

(*) Notice: Subject to any disclaimer, the term of this patent is extended or adjusted under 35 U.S.C. 154(b) by 0 days.

(21) Appl. No.: 09/924,980

(22) Filed: Aug. 8, 2001

(65) Prior Publication Data

US 2003/0029316 A1 Feb. 13, 2003

(51) Int. Cl.⁷ ............................................. B01D 47/02
(52) U.S. Cl. ............................. 95/226; 96/329; 96/352; 96/371
(58) Field of Search ........................ 95/226, 214; 96/329, 96/351, 352, 353, 371

(56) References Cited

U.S. PATENT DOCUMENTS

| | | | |
|---|---|---|---|
| 91,092 A | | 6/1869 | Cullmann |
| 176,585 A | | 4/1876 | Bradley |
| 199,577 A | | 1/1878 | Rohde |
| 251,407 A | * | 12/1881 | Bruns |
| 404,621 A | | 6/1889 | Hibbert |
| 853,435 A | | 5/1907 | Blackmore |
| 915,000 A | | 3/1909 | Walter et al. |
| 1,001,094 A | | 8/1911 | Torchiani |
| 1,358,333 A | * | 11/1920 | Rudloff |
| 1,455,385 A | | 5/1923 | Blackwood |
| 1,653,387 A | | 12/1927 | Brown |
| 1,876,465 A | | 9/1932 | Misner |
| 2,088,720 A | | 8/1937 | Poliniak |
| 2,092,925 A | | 9/1937 | Lithgow |
| 2,247,566 A | | 7/1941 | Walton |
| 2,261,037 A | | 10/1941 | Schwab |
| 2,318,637 A | | 5/1943 | Schwab |
| 2,405,494 A | | 8/1946 | Dupuy |
| 2,501,541 A | * | 3/1950 | Sharp |
| 2,570,623 A | | 10/1951 | Wistor |
| 2,784,801 A | | 3/1957 | Lunde |
| 2,850,877 A | | 9/1958 | Slomer |
| 3,048,958 A | | 8/1962 | Barnes |
| 3,124,937 A | | 3/1964 | King |
| 3,252,402 A | | 5/1966 | Burmeister |
| 3,724,454 A | * | 4/1973 | Brown |
| 4,687,494 A | * | 8/1987 | Escobal |
| 4,834,267 A | | 5/1989 | Schroer et al. |
| 5,034,038 A | * | 7/1991 | Olson |
| 5,058,621 A | | 10/1991 | Thumm |
| 5,078,759 A | | 1/1992 | Kira |
| 5,160,515 A | | 11/1992 | Nelson et al. |
| 5,213,597 A | | 5/1993 | Campbell |
| 5,225,158 A | | 7/1993 | Tayebi et al. |
| 5,240,043 A | | 8/1993 | Campbell |
| 5,328,059 A | | 7/1994 | Campbell |
| 5,358,009 A | | 10/1994 | Campbell |
| 5,503,659 A | | 4/1996 | Crosman |
| 5,558,256 A | | 9/1996 | Miller et al. |
| 5,836,351 A | | 11/1998 | Underwood, III |
| 5,871,562 A | | 2/1999 | Culoso |
| 6,082,394 A | | 7/2000 | Lin |

* cited by examiner

Primary Examiner—Duane Smith
(74) Attorney, Agent, or Firm—Price Heneveld Cooper Dewitt & Litton

(57) ABSTRACT

A treatment device is attached to a sealed container to provide clean replacement atmosphere to maintain the purity and cleanliness of the uncontaminated liquid remaining in the container. The device includes a valving system arranged to control flow of atmosphere into and out of the container, and includes a bubbler filled with treatment liquid, such as a disinfectant or purifying agent. Filtered air is bubbled through the treatment liquid prior to feeding the replacement atmosphere into the sealed container. In one embodiment, a floating valve assists in preventing undesired suction of the treatment liquid into the container. In another embodiment, the treatment device is attached to exhaust atmosphere to keep an ambient area clean as new liquid is added to the container and harmful atmosphere is exhausted. Methods related to the above are also defined and claimed.

19 Claims, 2 Drawing Sheets

ATMOSPHERE TREATMENT DEVICE FOR SEALED CONTAINERS

BACKGROUND

The present invention relates to an atmosphere treatment device that can be used to treat, clean, and sterilize replacement atmosphere entering or exiting a container as liquid is drawn off or added to the container. In particular, the present atmosphere treatment device is very useful in public water systems where water is stored in a container and replacement air entering the container as water is dispensed may cause contamination of the water remaining in the container. However, the present invention is not believed to be limited to just this single area, as will be apparent from the following discussion.

Many different water systems using rigid containers are used by the public for drinking water, such as municipal water towers, five-gallon bottled water delivered at regular intervals, and bulk water delivered into rigid storage containers stored at on-site locations. The water in these containers are at risk for contamination by air-borne contaminants because untreated ambient air replaces the liquid as the liquid is removed from the respective containers. The airborne contaminants can include dirt, dust, mold, algae, germs, bacteria, chemicals, and other organic and inorganic matter that are potentially harmful and/or that detract from the taste and healthiness of drinking water.

Even state-approved systems and filtered water delivery systems have this problem. For example, state-approved bulk drinking water is delivered by tank trucks, then pumped into smaller vented tanks at the customer's site where it is used as an alternative source of drinking water. Several Californian companies in the water-delivery business use 5-micron filters to reduce dust and dirt in their systems. However, they still have a problem with algae, because algae particles find their way past or through the filtering system. There are several ways that this can occur. Algae spores can potentially be carried by air moisture as air flows through the filters, such that the filters are not effective at filtering out the algae. Where a filter is used as a breather, any contact from over-filling or expansion of liquid in the container tanks can potentially be sucked back into the drinking water, where it contaminates the contents of the tanks. Some tanks have a cover that is removed for filling, which compromises a quality of the water in the tank by permitting a direct open access for ambient air and airborne contaminants to enter into the tank. Even though the open access is temporary, it only takes a single particle, spore, seed, or germ to initiate a growing active contamination problem.

Advancements in pollution-detecting equipment and scientific knowledge have uncovered many health issues with chemicals and bacteria in the water we drink and the air we breathe. This has created a huge industry that deals with treated and filtered water and air, with filters being provided for removing suspended particles and chemicals and for treating bacteria and algae. Often, ozone, chlorine, ultraviolet light, and distillation are used to address the bacteria problems in drinking water. However, these treatments are potentially a safety hazard in concentrated forms, are expensive and difficult to reliably dispense in accurate and safe ranges, and are difficult to uniformly and widely disperse into drinking water. Further, they can cause undesirable side effects in certain percentages of the human population, and/or can cause poor taste, odors, and other problems.

It is believed that the ability to treat water and keep it in sealed sanitary containers is a preferred method for protecting water quality. However, because of cost, convenience, and/or the lack of an effective alternative method, many liquid products are stored in rigid tanks. Rigid containers that dispense liquid by use of gravity or pumps rely on the flow of untreated ambient replacement air to prevent vacuum from developing that would stop and/or slow restrict outflow of liquid. For example, municipalities often use large water towers to store drinking water. Attached to a top of the towers is usually a 10-inch or 12 inch vent pipe in the shape of an upside down U-section. One end of the U-section is connected to the interior of the tower and the other end is open to ambient air with a 1 inch or ½ inch screen mesh over the end. Replacement air unfortunately carries unnecessary airborne pollutants inside the tower where they are absorbed into the water or where they float on top of the water. By removing as many pollutants as possible from the replacement air, the need for chlorine and anti-algae and anti-bacteria agents can be substantially reduced. However, to date, known systems have not been as effective as desired for reasons discussed above and below.

It is noted that, in the State of Michigan, municipal water suppliers are required to maintain a residual of 0.2 ppl chlorine disinfectant in potable water. Chlorine seems to be the disinfectant of choice, but it has some problems that cannot or should not be ignored. For example, organic debris found in surface water when treated with chlorine creates carcinogens. Further, any additional unnecessary pollutants that enter the water require additional chlorine to maintain the residual level of 0.2 ppl. Still further, to maintain a 0.2 ppl residual for the end user, the chlorine added to the water is excessive at the point of treatment, since the chlorine dissipates over distance.

In another example, the carbonated beverage industry uses ambient air tanks for storing liquid sugar. It is difficult to control mold and bacteria in these tanks.

In another example, the milk industry uses ambient air tanks on all milk house holding tanks, all milk delivery trucks and on some of the milk processing tanks. It is difficult to control airborne bacteria in these tanks, and difficult to meet USDA standards for purity and cleanliness.

The medical field has serious problems with several strains of antibiotic-resistant staff infection, such as may occur in medical treatment centers and in hospitals. Staff bacteria are an airborne bacterium that comes from the nose and throat of carriers and spreads easily. Storage containers in the medical field that use ambient replacement air would benefit greatly from a reliable, low-cost safeguard against airborne contamination.

It is also noted that certain medicines and chemicals react with plastic and need to be stored in rigid non-plastic containers. By using a valve assembly connected to the tank port on an open-air rigid container, the non-plastic container would be hermetically sealed. However, the valve assembly must relieve pressure in the container to prevent high pressures and/or vacuums from developing in the container that cause problems with liquid flow into and out of the container. The existing filters and disinfectants do not adequately nor satisfactorily solve this high/low pressure problem.

Therefore, there is a real need for hermetically sealing vented storage containers to allow for removing liquid therein, while protecting remaining uncontaminated liquid from contaminated replacement ambient atmospheric air. Further, an apparatus is desired that is cost-effective, efficient, relatively simple in its operation and construction, and that utilizes known materials and technology and low cost materials to accomplish significant improvements in the quality of water and other liquids.

SUMMARY OF THE PRESENT INVENTION

In one aspect of the present invention, an apparatus is provided for treating replacement atmosphere for hermetically sealed containers adapted to hold and dispense uncontaminated liquids sensitive to contamination. The apparatus includes a valving system having a container port adapted for connection to a sealed container, and having an intake port with an intake check valve configured to permit replacement atmosphere to be drawn to the container port for passing into the sealed container but to prevent backflow through the intake port. A bubbler includes a reservoir partially filled with a treatment liquid, the treatment liquid being chosen to treat replacement atmosphere drawn through the treatment liquid into the sealed container. The bubbler also includes an intake tube opening into the reservoir at a location below the normal level of the treatment liquid. A float valve is operably connected between the reservoir and the intake check valve to prevent the treatment liquid from flowing from the reservoir to the intake check valve but to permit flow of replacement atmosphere from the reservoir through the intake check valve to the container port.

In another aspect of the present invention, an apparatus is provided for treating replacement atmosphere for a sealed container, where the apparatus includes a valving system and a bubbler. The valving system includes a container port adapted for connection to the sealed container, and is configured to permit venting of existing atmosphere from the sealed container if the existing atmosphere of the sealed container experiences an unacceptable positive relative pressure, but is configured to permit replacement atmosphere to be drawn into the sealed container when the existing atmosphere of the sealed container experiences an unacceptable negative relative pressure. The bubbler is operably connected to the valving system and includes a reservoir partially filled with a treatment liquid chosen to treat the replacement atmosphere. The bubbler has a top portion located above the treatment liquid and a bottom below a normal level of the treatment liquid. The bubbler includes a particle filter adapted to receive replacement atmosphere from a source of the replacement atmosphere and a tube leading from the particle filter into the bottom of the reservoir for bubbling the replacement atmosphere up through the treatment liquid for treating the replacement atmosphere prior to introduction into the sealed container.

In another aspect of the present invention, an apparatus is provided for holding uncontaminated liquid in bulk and for dispensing the liquid in a public forum, such as in municipal water systems, businesses, restaurants, factories, food service organizations, hospitals and medical treatment facilities, dairy farms, and other high-demand environments where continued purity and healthiness of the liquid is important for maintaining public health. The apparatus includes a hermetically sealed container for holding liquid in bulk, the sealed container having a closeable outlet for dispensing the liquid incrementally, and further including an intake port for supplying replacement atmosphere as the liquid within the sealed container is drawn off. An atmosphere replacement system is connected to the intake port. The atmosphere replacement system includes a bubbler at least partially filled with treatment liquid and an atmosphere intake system operably connected to the bubbler for passing replacement atmosphere through the treatment liquid prior to feeding the replacement atmosphere into the sealed container.

In another aspect of the present invention, a storage system for receiving, storing and dispensing sanitary uncontaminated liquid includes a receiving valve for the transfer of new uncontaminated liquid into the storage system, and a storage tank communicating with the receiving valve for receiving and storing the uncontaminated liquid. The storage tank includes an existing atmosphere that, with the uncontaminated liquid in the storage tank, fills a volume of the storage tank. A valve assembly communicates with the storage tank, and includes a first check valve having a first valve seat and first valve which only allows treated replacement atmosphere to enter the storage tank, and a second check valve having a valve closure in communication with the first check valve. The second check valve only allows existing atmosphere to flow out of the storage tank. An atmosphere treatment device includes a bubbler chamber for receiving and treating replacement atmosphere to be communicated to the storage tank, with the bubbler chamber being operably connected to the valving system.

In yet another aspect of the present invention, a method comprises steps of providing a hermetically sealed container holding an uncontaminated liquid sufficient in volume for incremental dispensing as part of a bulk distribution system. The method further includes dispensing the uncontaminated liquid incrementally from the sealed container to a public group of users, where continued purity and healthiness of the uncontaminated liquid remaining in the sealed container is important for maintaining public health. The method still further includes, when dispensing the uncontaminated liquid, simultaneously filling the sealed container with replacement atmosphere, including passing the replacement atmosphere through a bubbler at least partially filled with a treatment liquid, whereby the replacement atmosphere is treated by the treatment liquid prior to feeding the replacement atmosphere into the sealed container.

In still another aspect of the present invention, an apparatus is provided for holding a contaminated liquid in bulk, where pretreatment of atmosphere being expelled is desired as the apparatus is being filled with new amounts of the contaminated liquid, where such pretreatment is desired in order to maintain public health. The apparatus includes a hermetically sealed container for holding contaminated liquid in bulk, and an atmosphere treatment system. The sealed container has a closeable outlet for dispensing the liquid, and includes an exhaust port for emitting atmosphere from the sealed container as new contaminated liquid is added to the sealed container. The atmosphere treatment system is connected to the intake port, and includes a bubbler at least partially filled with a treatment liquid. The exhaust port is operably connected to the bubbler for passing the atmosphere through the treatment liquid prior to releasing the atmosphere to an ambient area.

It is an object of the present invention to provide a purifying system for replacement atmosphere being added to replace liquid removed from a container in order to better maintain and keep pure the uncontaminated liquid remaining in the container.

It is an object of the present invention to provide an inexpensive, mechanically non-complex air purifying system with valving for controlled airflow.

It is an object of the present invention to improve the quality of replacement atmosphere being added to tanks, but to do so with a device that is able to handle the frequent expansion and contraction that occurs, both due to filling and dispensing of liquid in the tank, and also due to thermal heating and cooling that naturally occurs from ambient and environmental temperature changes.

It is an object of the present invention to provide a system adaptable to a wide variety of different external environments outside the container and internal environments within the container.

It is an object of the present invention to provide a system adaptable to a wide variety of different uncontaminated liquids and related needs, such as sterility, taste, odor, color, chemical-related needs, biological-related needs, human-preference requirements, and the like.

It is an object of the present invention to provide a system where a wide variety of different treatment liquids can be used, including ones designed to control algae, mold, mildew, chemical-related and pollution-related items, insect and debris-related items, and the like.

It is an object of the present invention to provide a system that, with minimal maintenance and inspection, is highly and reliably effective over a long period of time.

It is an object of the present invention to provide a system that is readily and easily repairable in the field and when in service, without compromising the container to which it is attached.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
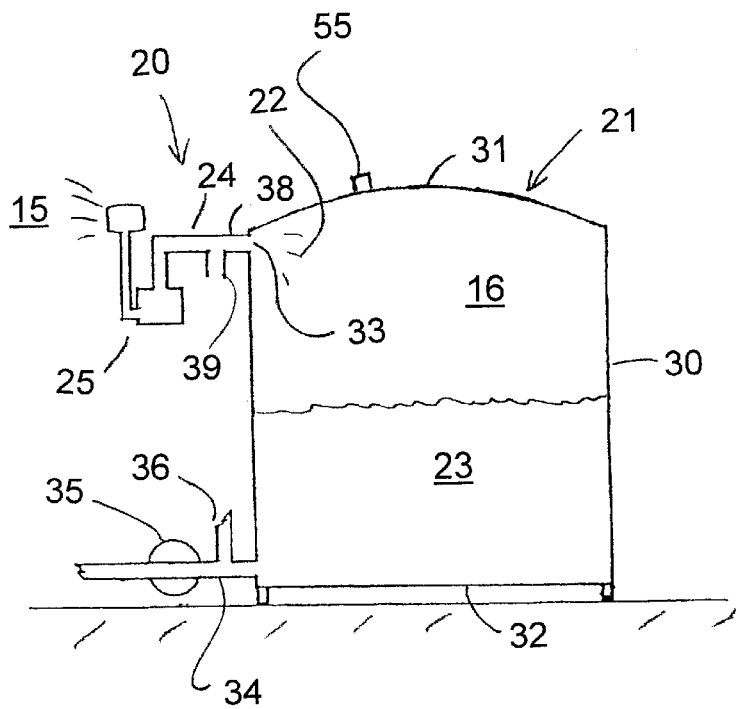
FIG. 1 is a side view of a storage tank including a treatment device embodying the present invention.

A treatment device 20 (FIG. 1) is attached to a hermetically sealed container 21 to provide clean replacement atmosphere 22 to maintain the purity and cleanliness of the uncontaminated liquid 23 remaining in the container 21. The device 20 includes a valving system 24 arranged to control flow of atmosphere into and out of the container 21, and further includes a bubbler 25 filled with treatment liquid 26, such as a disinfectant or purifying agent, that is operably connected to the valving system 24. Filtered air 27 is bubbled through the treatment liquid 26 prior to feeding the replacement atmosphere 22 into the sealed container 21. In the first embodiment (i.e. FIG. 1), a floating valve 28 is positioned between the bubbler 25 and the valving system 24 to assist in preventing undesired suction of the treatment liquid 26 into the container 21.

The illustrated container 21 (FIG. 1) is a water-filled container such as is shown in U.S. Pat. No. 5,358,009 (to Campbell). The entire contents of U.S. Pat. No. 5,358,009 are incorporated herein by reference, but it is noted that details of the container 21 are described below in sufficient detail for an understanding of the present invention by a person skilled in the art. The container 21 includes rigid side walls 30, a rigid top 31, and a rigid bottom 32, with a replacement-air inlet port 33 and a liquid inlet/outlet port 34 being provided in a convenient place, such as in the sidewalls 30. In the illustrated arrangement, a bulk delivery line connector 36 is connected to the port 34 and a pump 35 is also connected to the port 34. Further, the port 34 includes valves for controlling, adding, or removing liquid from the container 21. Ambient atmosphere (i.e. air) is identified by number 15, and existing atmosphere within the container 21 is identified by number 16.

Figure 2:
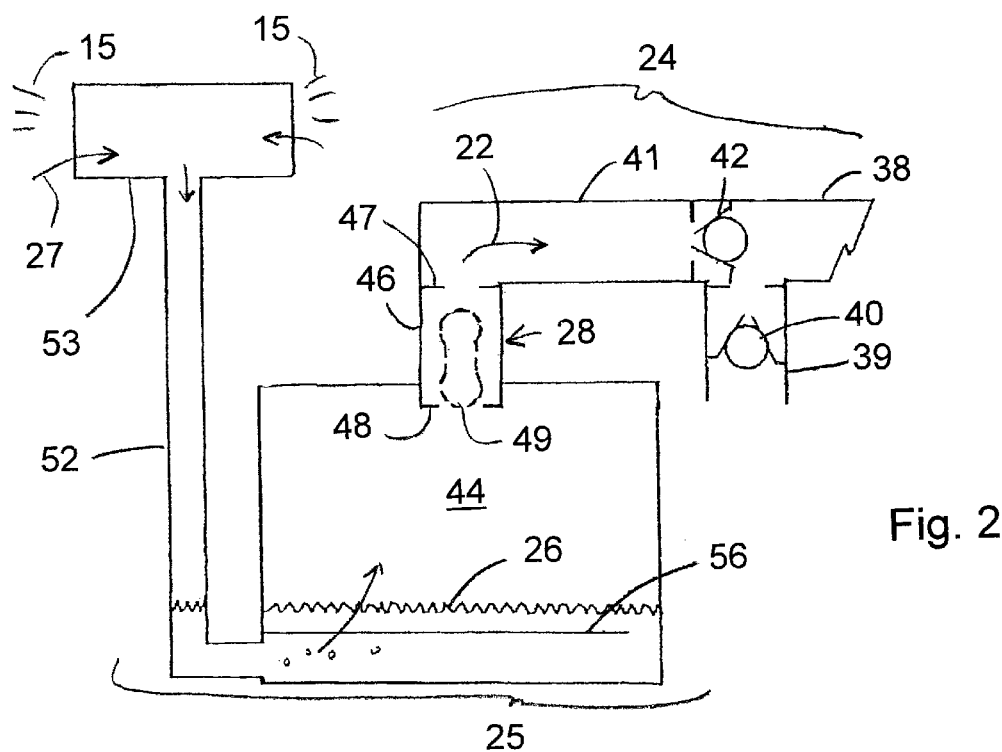
FIG. 2 is an enlarged side view of the treatment device shown in FIG. 1.

The valving system 24 (FIG. 2) includes a horizontal tube section 38 connected to a top of the sidewall 30, for providing access for atmosphere being fed into or exhausted from the container 21. A down tube section 39 is connected to the horizontal tube section 38, and a check valve 40 is positioned in the down tube section 39. The down tube section 39 opens to ambient atmosphere 15, and the check valve 40 is positioned and configured to seal when the pressure of the atmosphere 16 in the container 21 is below ambient air pressure, but is configured to release and vent to the ambient area when the pressure within the container 21 is a predetermined amount above ambient air pressure. The illustrated check valve 40 includes a valve seat and spring-biased ball check element, but it is noted that any one of a variety of different check valves 40 can be used.

The valving system 24 further includes a second tube section 41 connected to the horizontal tube section 38 and that leads to the bubbler 25. A second check valve 42 is positioned in the second tube section 41. The second check valve 42 is configured to seal when the atmosphere 16 in the container 21 is above ambient air pressure, so that the container atmosphere 16 is not forced "backwardly" into the bubbler 25, but is configured to allow cleaned atmosphere 22 to pass through the check valve 42 when the pressure within the container 21 is below ambient air pressure. The illustrated second check valve 42 includes a valve seat and spring-biased ball check element, but it is noted that any one of a variety of different check valves 40 can be used.

The bubbler 25 includes a bubbler chamber 44 connected to the second tube section 41 by the floating check valve 28. The float check valve 28 is used to prevent towering of the treatment liquid 26, which can occur in the event that a reservoir container would be broken or excessive vacuum released created by a plugged filter. The floating check valve 28 includes a tube section 46 with top and bottom seats 47 and 48, respectively, that a floating element 49 is shaped to sealingly engage. It is contemplated that the floating element 49 can be in the shape of a ball, an elongated "ball, or any other shape providing top and bottom sealing surfaces. The floating element 49 is normally biased by gravity into engagement with the bottom seat 48, such that it acts as a backup sealing arrangement to the second check valve 42. When a liquid is drawn from or dispensed from the container 21, a vacuum is created in the atmosphere 16 in the container 21, which causes replacement air 22 to be drawn through the bubbler 25 and through check valves 28 and 42 and into the container 21. When pressure is again equalized between the atmosphere 16 in the container 21 and the ambient atmosphere 15, the check valves 28 and 42 reseat and again provide a sealing function.

The floating element 49 provides an additional function. The bubbler chamber 44 is partially filled with a treatment liquid 26, such as a disinfectant solution. If the bubbler chamber 44 is overfilled with treatment liquid 26, the floating element 44 has a low enough specific gravity such that it floats on the treatment liquid 26 and moves to a sealing position against the top seat 47, preventing the treatment liquid 26 from flowing into the tube sections 41 and 38. Also, in the event of a sudden change in pressure (such as a sudden vacuum in the container 21 or a sudden high increase in pressure in the ambient atmosphere 15), a surge of treatment liquid 26 can flow upwardly against the float element 49. The float element 49 is designed to prevent undesired flow of liquid 26 past element 49. In other words, a stable and controlled flow of clean atmosphere 22 past the floating check valve 45 in order for the floating check valve 45 to remain open.

The bubbler 25 includes a vertical intake tube 52 with a filter 53 at its upper/free end. The intake tube 52 is L-shaped and has a bottom leg connected to the bubbler chamber 44 at a low/bottom location under a diffuser wall 56 where ambient atmosphere 15 (i.e. uncleaned air with airborne particles and matter therein) will bubble up through the treatment liquid 26.

A burst valve 55 is attached to the tank 21 to prevent an undesirably high pressure (or suction) from building within the tank 21. It is noted that the burst valve 55 could be included in other locations to provide safety against over-pressure within the valving system 24 and/or the bubbler 25 and/or the container 21.

Figure 3:
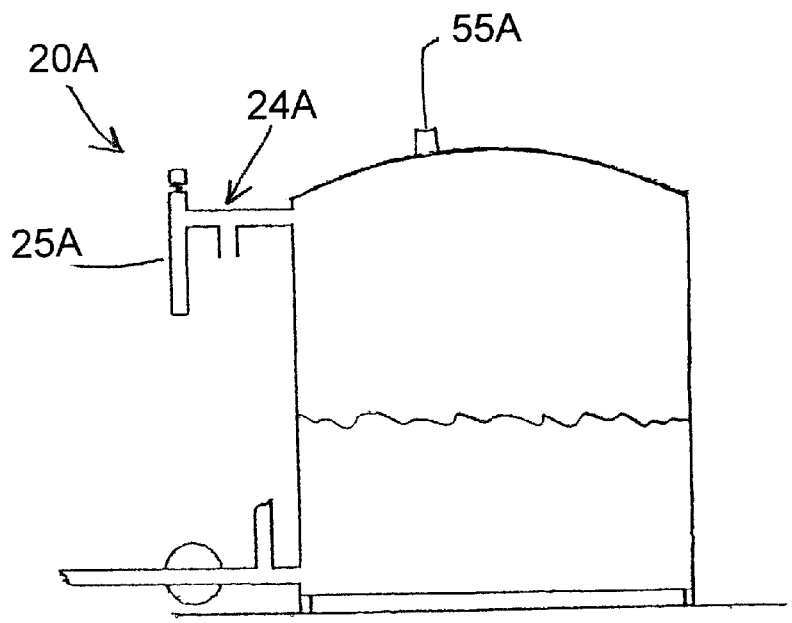
FIG. 3 is a side view of another storage tank including a modified treatment device embodying the present invention.
Figure 4:
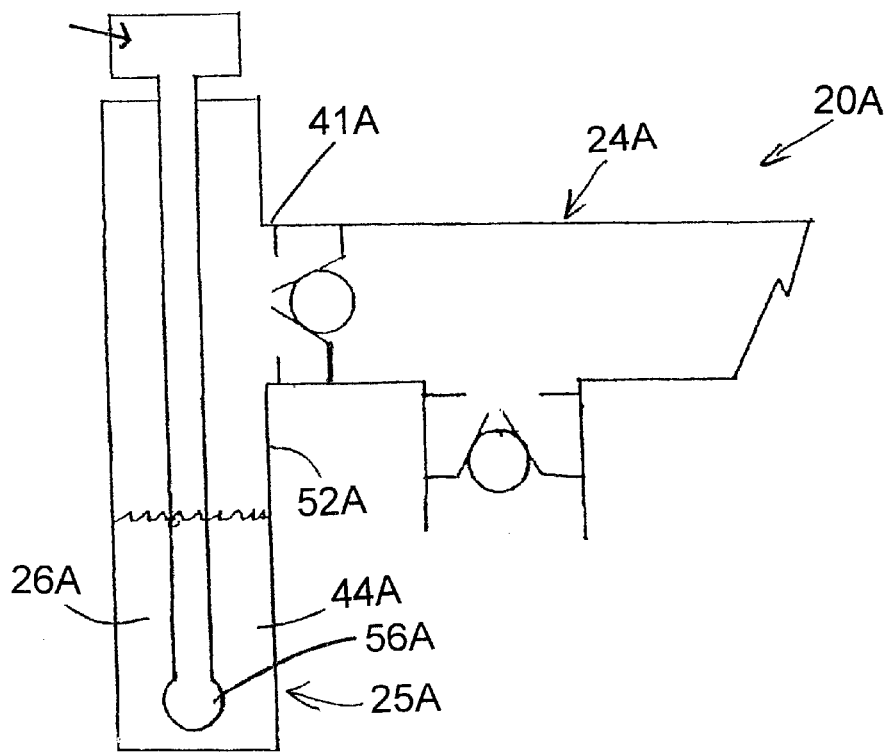
FIG. 4 is an enlarged side view of the treatment device shown in FIG. 3.

The apparatus 20A (FIGS. 3–4) include many components and features identical to or similar to the apparatus 20. In order to reduce redundant discussion, identical and similar components and features are identified with the same numbers, but with the addition of the letter "A".

The apparatus 20A (FIGS. 3–4) includes a valving system 24A and bubbler 25A operably connected similar to the apparatus 20. However, in apparatus 20A, the vertical intake tube 52A extends vertically downwardly into the bubbler chamber 44A. A lower end of the vertical intake tube 52A includes a diffuser 56A shaped to create a finer and more uniform array of bubbles flowing upwardly through the treatment liquid 22A. Also in apparatus 20A, the floating check valve (28) is eliminated, and the second tube section 41A is directly connected to the bubbler chamber 44A at a location near a top of the bubbler chamber 44A. A burst valve 55A is attached to a sidewall of the bubbler chamber 44A such as at a location between a normal top level of the treatment liquid 22A and the high location of the second tube section 41A (or alternatively at a location under the level of treatment liquid 22A so that it dumps the treatment liquid 22A if a high pressure problem develops).

In apparatus 20 and 20A, the operation is generally described as follows. As liquid is removed from the storage tank (i.e. container 21 )(or container 21A), the vacuum created pulls ambient air 15 through the filter and the bubbler 25 into the valving system 24 and into the container 21. As the ambient air 15 is drawn through the treatment liquid 26 in the bubbler chamber 44, the ambient air 15 is cleaned based on the characteristics and properties of the treatment liquid 50. Check valves 38 and 42 in the valving system 24 are spring-biased with light pressure to a closed position, such that the vacuum in the container 21 temporarily opens them to allow the clean replacement atmosphere to pass into the container 21, but so that the check valves 38 and 42 automatically reseat and close off the atmosphere 16 within the container 21 once an equalized pressure is achieved. When the container 21 is refilled, pressure builds within the atmosphere 16 in the container 21. When the pressure is sufficient, the check valve 40 opens, releasing the atmosphere 16 to an ambient area.

It is noted that components and the physical arrangement of apparatus 20 and 20A can be interchanged. For example the float check valve arrangement of apparatus 20 could be used with apparatus 20A, and the bubbler chamber arrangement of apparatus 20A could be used with apparatus 20.

Even though the illustrated apparatus 20 and 20A are shown as being operably attached for cleaning/treating air going into the container 21, it is specifically contemplated that the present treatment device 20 can be "reversed" and operably connected to clean/treat atmosphere being exhausted from the container 21, such as at an exhaust port (39), so as to keep an ambient area clean as new liquid is added to the container 21. For example, this arrangement would be used to prevent potentially harmful and undesirable exhaust atmosphere from being exhausted into an ambient area. For example, the harmful exhaust atmosphere could include airborne contaminants such as any undesirable pollutant, toxic emissions, undesirable ingredient, dirt, dust, mold, algae, germs, bacteria, chemicals, allergy-aggravating materials, and other organic and inorganic matter that are potentially harmful and/or that detract from the healthiness and safeness of an area. The ability to reconnect the apparatus 20 (or 20A) to a different port on the illustrated container 21 is within the skill of a person of ordinary skill, and accordingly, a new and separate drawing is not believed to be necessary.

It is to be understood that variations and modifications can be made on the aforementioned structure without departing from the concepts of the present invention, and ink further it is to be understood that such concepts are intended to be covered by the following claims unless these claims by their language expressly state otherwise.

I claim:

1. An apparatus for treating replacement atmosphere for hermetically sealed containers adapted to hold and dispense uncontaminated liquids sensitive to contamination, comprising:

a valving system including a container port adapted for connection to a sealed container, and including an intake port with an intake check valve configured to permit replacement atmosphere to be drawn to the container port for passing into the sealed container but to prevent backflow through the intake port;

a bubbler including a reservoir partially filled with a treatment liquid, the treatment liquid being chosen to treat replacement atmosphere drawn through the treatment liquid into the sealed container, the bubbler including an intake tube opening into the reservoir at a location below the normal level of the treatment liquid; and a float valve operably connected between the reservoir and the intake check valve to prevent the treatment liquid from flowing from the reservoir to the intake check valve but to permit flow of replacement atmosphere from the reservoir through the intake check valve to the container port.

2. The apparatus defined in claim 1, wherein the valving system includes an exhaust port with a check valve configured to permit venting from the container port if the sealed container is over-pressurized.

3. The apparatus defined in claim 1, wherein the treatment liquid comprises a disinfecting solution.

4. The apparatus defined in claim 1, wherein the bubbler includes a filter on the intake tube.

5. The apparatus defined in claim 1, wherein the float valve includes a top seat, a bottom seat, and a float element adapted to engage and seal against the top seat to prevent the treatment liquid from flowing from the reservoir to the intake check valve, and further, the float member being engageable with the bottom seat to prevent backflow from the intake check valve to the reservoir.

6. An apparatus for treating replacement atmosphere for hermetically sealed containers adapted to hold and dispense contaminable liquids, where the sealed containers require clean replacement atmosphere as the liquid is dispensed, comprising:

a pre-assembled valving system including a container port adapted for connection to a sealed container, the valving system being configured to permit venting of existing atmosphere from the sealed container if the existing atmosphere of the sealed container experiences an unacceptable positive relative pressure but being configured to permit replacement atmosphere to be drawn into the sealed container when the existing atmosphere of the sealed container experiences an unacceptable negative relative pressure;

the valving system including a bubbler and a filter operably interconnected to treat and screen the replacement atmosphere as the replacement atmosphere flows into the sealed container, the bubbler including a reservoir partially filled with a treatment liquid chosen to treat the replacement atmosphere, the bubbler having a top portion located above the treatment liquid and a bottom below a normal level of the treatment liquid, the bubbler including a tube leading into the bottom of the reservoir for bubbling the replacement atmosphere up through the treatment liquid for treating the replacement atmosphere prior to introduction into the sealed container.

7. The apparatus defined in claim 6, wherein the treatment liquid comprises a disinfecting solution.

8. The apparatus defined in claim 6, including a sealed container operably connected to the container port, the valving system being removably attached as a pre-assembled unit to the sealed container.

9. An apparatus for holding uncontaminated liquid in bulk and for dispensing the liquid in a public forum, where continued purity and healthiness of the liquid is important for maintaining public health, comprising:

a hermetically sealed container for holding liquid in bulk, the sealed container having a closeable outlet for dispensing the liquid incrementally, the sealed container including an intake port for supplying replacement atmosphere as the liquid within the sealed container is drawn off;

an atmosphere replacement system connected to the intake port, the atmosphere replacement system including a bubbler at least partially filled with treatment liquid and an atmosphere intake system operably connected to the bubbler for passing replacement atmosphere through the treatment liquid prior to feeding the replacement atmosphere into the sealed container; and a valving system having an exhaust port with a check valve configured to permit venting from the container port if the sealed container is over-pressurized.

10. An apparatus for holding uncontaminated liquid in bulk and for dispensing the liquid in a public forum, where continued purity and healthiness of the liquid is important for maintaining public health, comprising:

a hermetically sealed container for holding liquid in bulk, the sealed container having a closeable outlet for dispensing the liquid incrementally, the sealed container including an intake port for supplying replacement atmosphere as the liquid within the sealed container is drawn off; and an atmosphere replacement system connected to the intake port, the atmosphere replacement system including a bubbler at least partially filled with treatment liquid and an atmosphere intake system operably connected to the bubbler for passing replacement atmosphere through the treatment liquid prior to feeding the replacement atmosphere into the sealed container, wherein the treatment liquid comprises a disinfecting solution.

11. An apparatus for holding uncontaminated liquid in bulk and for dispensing the liquid in a public forum, where continued purity and healthiness of the liquid is important for maintaining public health, comprising:

a hermetically sealed container for holding liquid in bulk, the sealed container having a closeable outlet for dispensing the liquid incrementally, the sealed container including an intake port for supplying replacement atmosphere as the liquid within the sealed container is drawn off;

an atmosphere replacement system connected to the intake port, the atmosphere replacement system including a bubbler at least partially filled with treatment liquid and an atmosphere intake system operably connected to the bubbler for passing replacement atmosphere through the treatment liquid prior to feeding the replacement atmosphere into the sealed container; and a float valve with a top seat, a bottom seat, and a float element operably connected to the bubbler and adapted to engage and seal against the top seat to prevent the treatment liquid from flowing from the reservoir to the intake check valve, and further, the float member being engageable with the bottom seat to prevent backflow from the intake check valve to the reservoir.

12. A storage system for receiving, storing and dispensing sanitary uncontaminated liquid, comprising:

a receiving valve for the transfer of uncontaminated liquid into said storage system;

a storage tank communicating with said receiving valve for receiving and storing said uncontaminated liquid, the storage tank including an existing atmosphere that, with the uncontaminated liquid in the storage tank, fills a volume of the storage tank;

a valve assembly communicating with said storage tank, said check valve assembly including:
  a first check valve including a first valve seat and first valve which only allows treated replacement atmosphere to enter the storage tank;
  a second check valve including a valve closure in communication with said first check valve, said second check valve only allowing existing atmosphere to flow out of said storage tank; and
  an atmosphere treatment device including a bubbler chamber for receiving and treating replacement atmosphere to be communicated to the storage tank, the bubbler chamber being operably connected to the valving system.

13. A method comprising steps of:

providing a hermetically sealed container holding an uncontaminated liquid sufficient in volume for incremental dispensing as part of a bulk distribution system;

dispensing the uncontaminated liquid incrementally from the sealed container to a public group of users, where continued purity and healthiness of the uncontaminated liquid remaining in the sealed container is important for maintaining public health; and when dispensing the uncontaminated liquid, simultaneously filling the sealed container with replacement atmosphere, including passing the replacement atmosphere through a bubbler at least partially filled with a disinfecting treatment liquid, whereby the replacement atmosphere is treated by the treatment liquid prior to feeding the replacement atmosphere into the sealed container.

14. An apparatus for holding a contaminated liquid in bulk, where pretreatment of atmosphere being expelled is desired as the apparatus is being filled with new amounts of the contaminated liquid, where such pretreatment is desired in order to maintain public health, comprising:

a hermetically sealed container for holding contaminated liquid in bulk, the sealed container having a closeable outlet for dispensing the contaminated liquid, and including an exhaust port for emitting atmosphere from the sealed container as new contaminated liquid is added to the sealed container; and an atmosphere treatment system connected to the exhaust port, the atmosphere treatment system including a bubbler at least partially filled with treatment liquid, the exhaust port being operably connected to the bubbler for passing the atmosphere through the treatment liquid prior releasing the atmosphere to an ambient area.

15. An apparatus for holding a contaminated liquid in bulk, where pretreatment of atmosphere being expelled is desired as the apparatus is being filled with new amounts of the contaminated liquid, where such pretreatment is desired in order to maintain public health, comprising:

a hermetically sealed container for holding contaminated liquid in bulk, the sealed container having a closeable outlet for dispensing the contaminated liquid, and including an exhaust port for emitting atmosphere from the sealed container as new contaminated liquid is added to the sealed container; and an atmosphere treatment system connected to the intake port, the atmosphere treatment system including a bubbler at least partially filled with treatment liquid, the exhaust port being operably connected to the bubbler for passing the atmosphere through the treatment liquid prior releasing the atmosphere to an ambient area, wherein the atmosphere treatment system includes a preassembled valving system for controlling the atmosphere by passing through the treatment liquid.

16. The apparatus defined in claim 15, wherein the atmosphere treatment system is self-contained and characteristically does not include a vacuum device nor a blower for motivating the atmosphere through the treatment liquid.

17. The apparatus defined in claim 15, wherein the atmosphere treatment system and hermetically sealed container form a complete system that operates without a requirement for outside power.

18. The apparatus defined in claim 15, wherein the treatment liquid is a disinfectant.

19. The apparatus defined in claim 14, wherein the treatment liquid is a disinfectant.

* * * * *